(12) United States Patent
Nicol (10) Patent No.: US 9,953,230 B2
(45) Date of Patent: Apr. 24, 2018

(54) DEVICE, SYSTEM AND METHOD FOR VEHICLE SAFETY SENSING AND ALERTING BY USING CAMERA AND TEMPERATURE SENSOR

(71) Applicant: David Stuart Nicol, Toronto (CA)

(72) Inventor: David Stuart Nicol, Toronto (CA)

( * ) Notice: Subject to any disclaimer, the term of this patent is extended or adjusted under 35 U.S.C. 154(b) by 118 days.

(21) Appl. No.: 14/244,259

(22) Filed: Apr. 3, 2014

(65) Prior Publication Data

US 2015/0286882 A1  Oct. 8, 2015

(51) Int. Cl.
| | | |
|---|---|---|
| G06K 9/00 | (2006.01) | |
| B60R 1/00 | (2006.01) | |
| G08B 21/22 | (2006.01) | |
| G08B 21/24 | (2006.01) | |
| B60N 2/02 | (2006.01) | |

(52) U.S. Cl.
CPC ............ G06K 9/00838 (2013.01); B60R 1/00 (2013.01); G08B 21/22 (2013.01); B60N 2002/0272 (2013.01); G08B 21/24 (2013.01)

(58) Field of Classification Search
CPC .................. G06K 9/00838; B60N 2/00; B60N 2002/0272; B60R 1/00; G08B 21/22; G08B 21/24
See application file for complete search history.

(56) References Cited

U.S. PATENT DOCUMENTS

| | | | | | |
|---|---|---|---|---|---|
| 3,694,690 | A | * | 9/1972 | Shimizu | B60Q 1/486 315/149 |
| 4,421,078 | A | * | 12/1983 | Hurner | F16N 39/00 123/1 A |
| 5,912,615 | A | * | 6/1999 | Kretzmar | B60R 25/04 180/287 |
| 6,243,015 | B1 | * | 6/2001 | Yeo | G08B 21/06 340/575 |

(Continued)

FOREIGN PATENT DOCUMENTS

| | | |
|---|---|---|
| JP | 2007316000 A | 10/2004 |
| WO | 02/087910 A2 | 11/2002 |

OTHER PUBLICATIONS

Anieros LLC Press Release, Child Safety Seat System Created to Prevent Hot-Car Deaths; Aneiros Crowd Funding Campaign Launched, PRWed, Mar. 18, 2014.

*Primary Examiner* — Joseph Suh
(74) *Attorney, Agent, or Firm* — Bereskin & Parr LLP/S.E.N.C.R.L., s.r.l.; Isis E. Caulder; Timothy Cameron Gale (57) ABSTRACT

Systems and methods for detecting a subject in a vehicle are provided. A temperature sensor installed in the vehicle is automatically activated when the vehicle ignition switch is switched off. The temperature sensor monitors the internal vehicle temperature and activates a detection module when the monitored internal vehicle temperature reaches a threshold temperature. The detection module includes a camera (Continued)

that is configured to capture a first image of the vehicle interior and to subsequently capture a second image of the vehicle interior, and a monitoring module that is configured to analyze the first image and the second image to detect the subject. A response module is coupled to the detection module and configured to activate one or more alert mechanisms when the subject is detected.

18 Claims, 4 Drawing Sheets

(56) References Cited

U.S. PATENT DOCUMENTS

| | | | | |
|---|---|---|---|---|
| 6,759,954 | B1* | 7/2004 | Myron | H05B 37/0227 |
| | | | | 315/294 |
| 7,170,401 | B1 | 1/2007 | Cole | |
| 7,956,477 | B2* | 6/2011 | Yu | F02N 11/087 |
| | | | | 180/65.22 |
| 8,160,825 | B1* | 4/2012 | Roe, Jr. | H02J 13/00 |
| | | | | 702/58 |
| 8,232,874 | B1 | 7/2012 | Aneiros et al. | |
| 2003/0098909 | A1* | 5/2003 | Fritzsche | B60R 1/00 |
| | | | | 348/148 |
| 2004/0155783 | A1* | 8/2004 | Al-Sheikh | G08B 21/22 |
| | | | | 340/584 |
| 2005/0131607 | A1* | 6/2005 | Breed | B60N 2/002 |
| | | | | 701/45 |
| 2009/0096400 | A1* | 4/2009 | Yu | F02N 11/087 |
| | | | | 318/443 |
| 2009/0261979 | A1 | 10/2009 | Breed et al. | |
| 2011/0121956 | A1 | 5/2011 | Rodriguez | |
| 2012/0077104 | A1* | 3/2012 | Katano | F04C 29/0092 |
| | | | | 429/444 |
| 2013/0021463 | A1* | 1/2013 | Hatakeyama | A61B 5/18 |
| | | | | 348/78 |
| 2013/0021476 | A1* | 1/2013 | Trummer | B60R 22/48 |
| | | | | 348/148 |
| 2013/0180100 | A1* | 7/2013 | Zeng | E01C 19/004 |
| | | | | 29/592.1 |
| 2014/0218563 | A1* | 8/2014 | Sugimoto | G03B 17/20 |
| | | | | 348/231.6 |
| 2014/0281631 | A1* | 9/2014 | Asano | G06F 1/3231 |
| | | | | 713/323 |
| 2015/0379362 | A1* | 12/2015 | Calmes | G06K 9/2036 |
| | | | | 348/136 |

* cited by examiner

DEVICE, SYSTEM AND METHOD FOR VEHICLE SAFETY SENSING AND ALERTING BY USING CAMERA AND TEMPERATURE SENSOR

FIELD

Embodiments described herein generally relate to vehicle sensing and alerting systems, and more specifically to a system for vehicle safety sensing and alerting to detect a subject in a car in an extreme temperature situation.

INTRODUCTION

Every year, there are tragic news stories of children and pets left unattended in vehicles by parents or caregivers. In some cases, the unattended child or pet is, rescued from the vehicle before any serious consequences arise. However, every year there are reports of children who have died after being left accidentally in a vehicle by a parent or caregiver. These tragic occurrences are often the result of parents or caregivers inadvertently leaving children and pets in vehicles and have been termed cases of fatal distraction.

When a child or pet is left unattended in a vehicle, even when the outside temperature is not extreme, the interior temperature of the vehicle can change rapidly to a situation of extreme temperature. In these situations, it is imperative that the child or pet be removed from the vehicle as quickly as possible to reduce the risk of harm or even death. In most cases, however, it may not be readily apparent to bystanders, parents or caregivers that a child or pet has been left in the vehicle.

Accordingly, there exists a need for a vehicle safety sensing and alerting system that is able to detect when a child or pet has been left in a vehicle in a situation of extreme temperature and alert potential rescuers. Often, small children are secured in child seats in a vehicle that may restrict their movements. Similarly, if the child or pet is sleeping, they are unlikely to make any large movements. As a result, they may not be detected by vehicle safety sensing and alerting systems using motion sensors alone.

Accordingly, there exists a need for a vehicle safety sensing and alerting system that detects subtle movements of children or pets that occur even when they are secured in a child safety seat or while sleeping.

SUMMARY

The embodiments described herein provide in one aspect, a system for detecting a subject in a vehicle where the vehicle has an ignition switch and at least one seat, the system comprising a temperature sensor installed within the vehicle, a detection module coupled to the temperature sensor and a response module coupled to the detection module. The temperature sensor is coupled to the ignition switch and is automatically activated when the ignition switch is switched off; the temperature sensor monitors an internal vehicle temperature. The detection module has a camera and a monitoring module; the camera is activated when the monitored internal vehicle temperature reaches a threshold temperature. The camera is configured to capture a first image of the vehicle interior and to subsequently capture a second image of the vehicle interior. The monitoring module is configured to analyze the first image and the second image to detect the subject. The response module is configured to activate one or more alert mechanisms when the subject is detected.

The embodiments described herein provide in another aspect, a method for detecting a subject in a vehicle, the vehicle having an ignition switch, at least one seat and a temperature sensor installed within the vehicle. The method comprises activating the temperature sensor when the vehicle ignition switch is switched off; monitoring an internal vehicle temperature using the temperature sensor; activating a camera when the monitored internal vehicle temperature reaches a threshold temperature; capturing a first image of the vehicle interior using the camera; subsequently capturing a second image of the vehicle interior using the camera; analyzing the first image and the second image to detect the subject in the vehicle; and activating an alert mechanism when the subject is detected.

Further aspects and advantages of the embodiments described herein will appear from the following description taken together with the accompanying drawings.

DRAWINGS

For a better understanding of the described embodiments and to show more clearly how they may be carried into effect, reference will now be made, by way of example, to the accompanying drawings in which.

DESCRIPTION OF VARIOUS EMBODIMENTS

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

Figure 1:
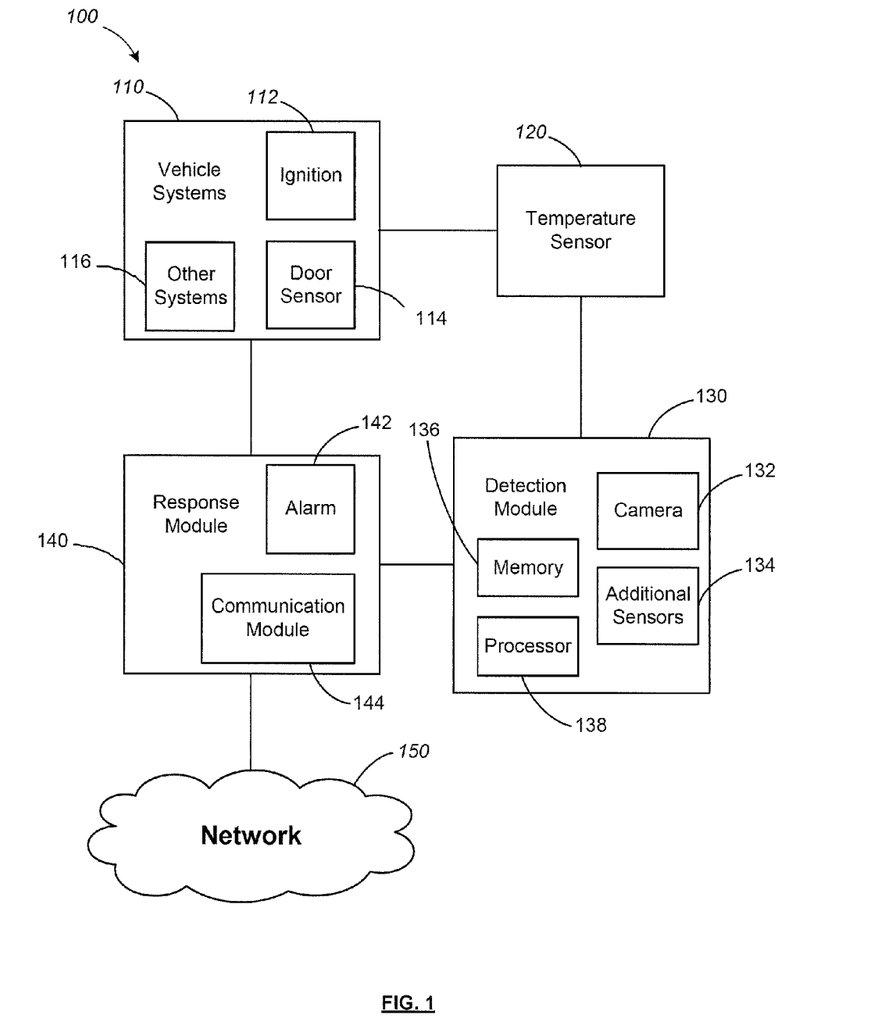
FIG. 1 shows a block diagram illustrating a vehicle safety sensing and alerting system in accordance with at least one embodiment.

FIG. 1 shows a block diagram illustrating system 100 for vehicle safety sensing and alerting. System 100 is operable to detect the presence of a subject in a vehicle when system 100 detects that the internal vehicle temperature has reached an extreme temperature. The term subject is used herein to refer to any living being, such as a child or pet, that may be left in a vehicle and could suffer serious harm or death due to extreme internal vehicle temperatures.

Although aspects of an implementation of system 100 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling system 100 and/or processor 138 to perform a particular method.

Figure 3:
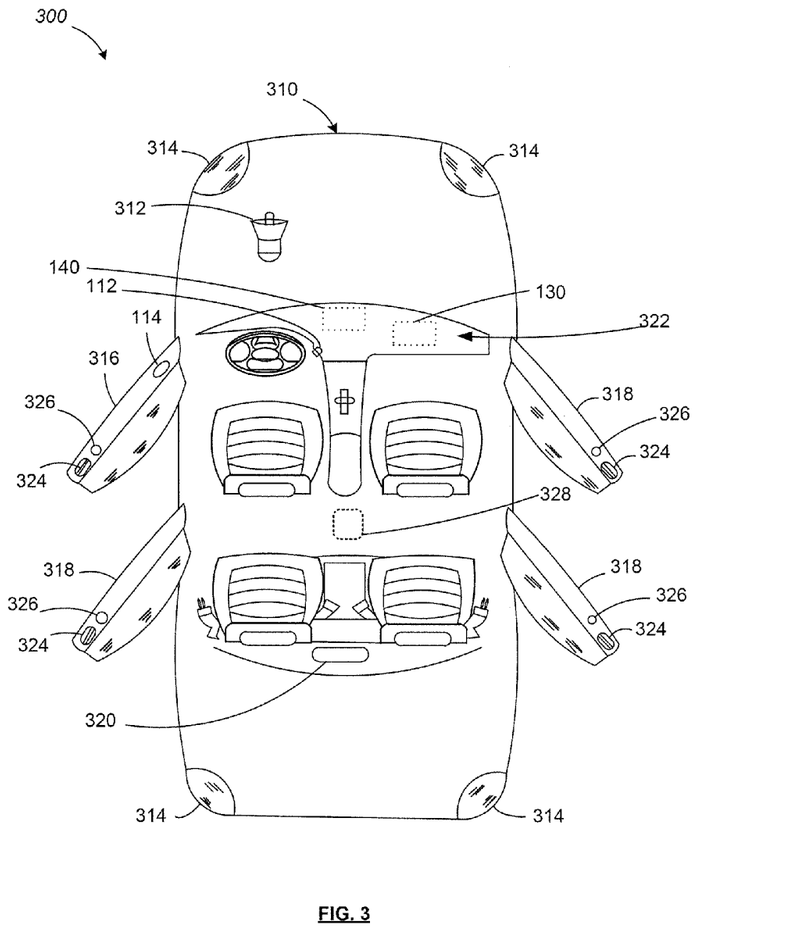
FIG. 3 shows a top view of a vehicle incorporating elements of the vehicle safety sensing and alerting system of FIG. 1, in accordance with at least one embodiment.
Figure 4:
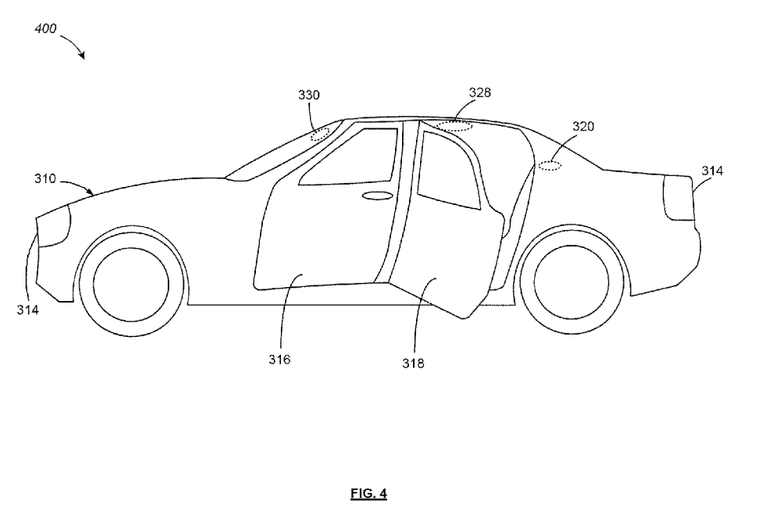
FIG. 4 shows a side view of the vehicle shown in FIG. 3 incorporating elements of the vehicle safety sensing and alerting system of FIG. 1, in accordance with at least one embodiment.

System 100 will be described with reference to FIGS. 3 and 4. FIG. 3 shows a top view of vehicle 310 in which a vehicle safety sensing and alerting system such as system 100 has been installed. FIG. 4 shows a side view of vehicle 310 shown in FIG. 3.

System 100 includes vehicle systems 110. Vehicle systems 110 can include ignition switch 112, door sensor 114 and other vehicle systems 116. As shown in FIG. 3, door sensor 114 may be located in driver's door 316. Door sensor 114 may be configured to detect when driver's door 316 has been opened. In some embodiments, door sensor 114 may be activated after ignition switch 112 is switched off. If door sensor 114 detects that driver's door 316 has been opened after ignition switch 112 is switched off, a warning mechanism may be activated to warn the driver to check the interior of vehicle 310 to ensure that no children or pets have been left in vehicle 310.

In some embodiments, door sensor 114 may be installed in other locations in vehicle 310 and configured to detect when driver's door 316 has been opened. In some embodiments, system 100 may include a plurality of door sensors, one door sensor coupled to driver's door 316 and additional door sensors coupled to each of the passenger doors 318. Each door sensor may be configured to detect when the door to which it is coupled has been opened. A warning mechanism may be activated when a door sensor detects that one of the doors has been opened after ignition switch 112 has been switched off.

System 100 also includes temperature sensor 120. Temperature sensor 120 is coupled to ignition switch 112 and is automatically activated when ignition switch 112 is switched off. In some embodiments, when ignition switch 112 is switched off a relay activates temperature sensor 120. In some embodiments, the relay may be a single pole single throw (SPST) relay powered by the accessory circuit of vehicle 310. Temperature sensor 120 can also be automatically de-activated when the ignition switch 112 is switched on.

In some embodiments, system 100 may be continuously active once ignition switch 112 has been switched off. System 100 may be configured to operate with a low power drain to ensure that it can operate continuously. In some embodiments, the entirety of system 100 will require 12 volts to operate and will draw current ranging from 0.5 A to 3 A when monitoring vehicle 310 to detect a subject in a situation of extreme temperature.

Temperature sensor 120 is installed in vehicle 310 and configured to monitor the internal vehicle temperature of vehicle 310. In some embodiments, temperature sensor 120 may be installed in the headliner 328 of vehicle 310. Installing temperature sensor 120 in the headliner 328 may provide various benefits. For example, if temperature sensor 120 and/or other components of system 100 are installed in the headliner 328 near the vehicle interior light area, installation of temperature sensor 120 and the vehicle safety sensing and alerting system as a whole may be simplified. The vehicle interior light area already includes wiring to couple the vehicle interior lights to the power supply of vehicle 310. Thus, it may be simpler to retro-fit vehicle 310 with a vehicle safety sensing and alerting system by installing components of system 100 such as temperature sensor 120 in the headliner 328.

Installing temperature sensor 120 in the headliner 328 may also ensure that temperature sensor 120 detects an extreme temperature situation more rapidly. Installing temperature sensor 120 in an elevated position may ensure that it will detect elevated internal vehicle temperatures as soon as they occur.

In some embodiments, temperature sensor 120 may comprise a remote sensor such as a brass thermocouple, for example, positioned in the headliner 328. In some embodiments, the remote sensor may be small in size, approximately 6.35 millimeters or ¼ of an inch. A small remote sensor may facilitate unobtrusive installation of the remote sensor in a more desirable location in vehicle 310. In some embodiments, the remote sensor may be coupled to ignition switch 112 by a receiver located under the dashboard 322 of vehicle 310.

Temperature sensor 120 may also include a thermostat, such as a digital thermostat located along with the receiver. The thermostat can be set to a threshold temperature beyond which it may be harmful for a child or pet to remain in vehicle 310. In some embodiments, for example, the threshold temperature could be set in the range of 46-49 degrees Celsius or 115-120 degrees Fahrenheit.

In some cases, the threshold temperature can be set initially when temperature sensor 120 is installed in vehicle 310. In some cases, the threshold temperature of temperature sensor 120 cannot be adjusted after temperature sensor 120 has been installed. This can prevent tampering with temperature sensor 120 and reduce the risk of harm that could occur to a child or pet if the threshold temperature is set at too extreme a temperature.

As will be apparent to a skilled reader, various other type and configurations may be used for temperature sensor 120. For example, temperature sensor 120 may be installed in various locations throughout vehicle 310 such as, for example, the rear seat area 320, the dashboard 322 and the rearview mirror 330. In some embodiments, temperature sensor 120 may include various components such as a sensor, a thermostat, a receiver and other components suitable for monitoring the internal vehicle temperature of vehicle 310.

System 100 also includes detection module 130 coupled to temperature sensor 120. Detection module 130 can be automatically activated when temperature sensor 120 detects that the monitored internal vehicle temperature has reached the threshold temperature.

As shown in FIG. 1, detection module 130 includes camera 132, additional detection sensors 134, memory 136 and processor 138. Camera 132 is automatically activated when temperature sensor 120 detects that the internal vehicle temperature has reached the threshold temperature.

Camera 132 is installed in vehicle 310 so as to capture an image of the interior of vehicle 310. Camera 132 may be installed in vehicle 310 such that it operable to capture an image of all of the seats in vehicle 310. In embodiments when vehicle 310 has front seats and rear seats, camera 132 can be installed in vehicle 310 so as to capture an image including both the front seats and the rear seats. For example, camera 132 may be installed in headliner 328, adjacent to rearview mirror 330 or in other suitable locations in vehicle 310 that will be apparent to the skilled reader.

In some embodiments, camera 132 will be sufficiently small such that it can be unobtrusively installed in vehicle 310. Various camera types may be used for camera 132, such as a pinhole camera, cctv camera, fisheye camera and other types of cameras that would be apparent to a skilled reader. For example, a 9V pinhole CCTV camera approximately 12.7 millimeters or ½ inch in diameter can be used. In some cases, camera 132 may have a manual focus that is set when camera 132 is initially installed in vehicle 310.

Camera 132 is configured to initially capture a first image of the vehicle interior and to subsequently capture one or more subsequent images of the vehicle interior. In some embodiments, camera 132 may be a single camera installed in vehicle 310 such that it is operable to capture images all the seats in vehicle 310. In other embodiments, camera 132 may include a plurality of cameras installed in vehicle 310 such that at least one camera captures an image of each seat in vehicle 310.

In some embodiments, the plurality of cameras may be installed such that at least two cameras capture an image of each seat in vehicle 310. Having two cameras capture an image of each seat may help detect movements of children in child safety seats that can be configured in both a forward-facing and rear-facing manner. This may allow subtle movements in a child's face to be detected regardless of the configuration of the child safety seat. For example, in some embodiments, a first camera could be installed adjacent to rearview mirror 330 facing the rear of vehicle 310 while a second camera is installed near the ceiling of vehicle 310 above rear seat area 320 facing forward in vehicle 310. Other suitable configurations for embodiments using a plurality of cameras will be apparent to the skilled reader.

In some embodiments, as shown in FIG. 1, detection module 130 may also include at least one additional detection sensor 134. Additional detection sensors 134 may include one or more of an infrared motion sensor, an RF proximity sensor, an audio sensor and other sensors that may be suitable to detect a subject in vehicle 310. In embodiments employing one or more additional detection sensors 134, the additional detection sensors 134 can be automatically activated when temperature sensor 120 detects that the internal vehicle temperature has reached the threshold temperature.

Additional detection sensors 134 may assist in accurately detect a subject in vehicle 310. For example, an audio sensor may be able to detect a subject in vehicle 310 in the absence of any visibly detectable movements by detecting a small whimper or cry. The infrared motion sensor and RF proximity sensor may also be able to rapidly detect a subject in vehicle 310. Camera 132 and additional detection sensors 134 are configured to operate in conjunction to detect a subject in the vehicle.

Memory 136 may include random access memory (RAM) or similar types of memory. Also, memory 136 may store one or more applications for execution by processor 138. Applications may correspond with software modules comprising computer executable instructions to perform processing for the functions described below. In some embodiments, memory 136 may also include secondary storage devices such as a hard disk drive, floppy disk drive, CD drive, DVD drive, Blu-ray drive, or other types of non-volatile data storage. Processor 138 may execute applications, computer readable instructions or programs. The applications, computer readable instructions or programs may be stored in memory 136 or may be received from the Internet or other network 150.

Memory 136 may store a monitoring module application that is configured to analyze the output of camera 132 and additional detection sensors 134 to detect a subject in vehicle 310. The monitoring module may analyze the first image and the second image captured by camera 132 to detect a subject in vehicle 310. In some embodiments, the monitoring module will compare the first image and the second image and detect a change based on the comparison. The monitoring module may be configured to detect a subject in vehicle 310 when the detected change between the first image and the second image is greater than a predefined threshold.

The monitoring module may detect a change (or distortion) between the first image and the second image by analyzing the pair of images pixel by pixel using suitable algorithms that would be apparent to the skilled reader. In some embodiments, the monitoring module can detect a subject in vehicle 310 when the average change in pixels is above a predefined threshold. In some embodiments, the monitoring module will detect a subject in vehicle 310 when a threshold number of pixels, or a threshold number of pixels within a defined region, have experienced a change or distortion above a predefined threshold.

The monitoring module is also configured to monitor additional detection sensors 134. The monitoring module may detect a subject in vehicle 310 based on the outputs detected from additional detection sensors 134. If the output from any one of the camera 132 or the additional detection sensors 134 indicates a subject is present in vehicle 310, then the monitoring module can detect the subject.

System 100 also includes response module 140 coupled to detection module 130. In some embodiments of system 100, detection module 130 and response module 140 may be provided as a single module. Response module 140 is configured to activate an alert mechanism when detection module 130 has detected a subject in vehicle 310. An alert mechanism may be any sort of device or action that operates to alert a potential rescuer that a child or pet has been left in vehicle 310.

Alert mechanisms may include local alert mechanisms such as audible alarms or visual alert mechanisms intended to alert bystanders and passers-by that a child or pet is in vehicle 310 in an extreme temperature situation. Alert mechanisms may also include remote alert mechanisms intended to alert individuals located distant from vehicle 310 that a subject has been detected in vehicle 310 in an extreme temperature situation. Remote alert mechanisms may communicate with individuals associated with vehicle 310 such as the owner of vehicle 310 or other individuals identified by system 100. Remote alert mechanisms may also communicate with other potential rescuers such as, for example, emergency services (e.g. police department, fire department etc.) or personnel of a venue in close proximity to where vehicle 310 is parked.

Response module 140 may include alarm 142, which may be an existing vehicle alarm or a separate alarm installed along with the vehicle safety sensing and alerting system. Alarm 142 is operable to generate an audible alarm when a subject has been detected. Response module 140 may also include communication module 144 connected to a communication network such as network 150. Network 150 may include wireless connections to the internet and/or other types of computer or telecommunication networks.

In some embodiments, communication module 144 can be an existing vehicle communication system such as an OnStar system for example. In some embodiments, communication module 144 may also include a cellular communication module such as a GSM, GPRS or CDMA module operable to communicate with a wireless network.

Other suitable types of communication modules and cellular communication modules will be apparent to the skilled reader.

Communication module 144 can be configured to transmit a message over network 150 to an identified individual alerting them that a subject has been detected in vehicle 310. For example, a cell phone number of the owner of vehicle 310 may be stored in memory 136, and communication module 144 may be configured to send a text message or make a phone call to the owner of vehicle 310 alerting them that a subject has been detected in vehicle 310.

Communication module 144 may also be configured to call or transmit a message to emergency services personnel by, for example, calling 911. In some embodiments, memory 136 may have messages stored thereon messages that are to be transmitted by communication module 144 when a subject is detected. Communication module 144 can also be configured to transmit a location identifier along with the message sent to the identified individual or emergency services personnel. For example, communication module 144 may include GPS coordinates of vehicle 310 along with the message being transmitted.

In some cases, communication module 144 may also be configured to communicate with a local security office. For example, if vehicle 310 is parked at a venue such as a shopping mall having a security office equipped with a suitable receiver, communication module 144 may be configured to transmit a message to the security office indicating that a subject has been detected in vehicle 310 in the parking lot of the venue. Alerting local response personnel may reduce response time and improve the chances of a successful rescue.

Response module 140 may also be coupled to vehicle systems 110 to activate other alert mechanisms provided by other vehicle systems 116. For example, response module 140 may be configured to activate vehicle hazard lights 314 when detection module 130 has detected a subject in vehicle 310. Response module 140 may also be configured to generate an alert mechanism using vehicle horn 312.

In some embodiments, response module 140 may be further configured to take preventative measures when a subject is detected in vehicle 310. Preventative measures may include any actions intended to mitigate or alleviate the situation of extreme temperature. In some embodiments, response module 140 may be configured to use other vehicle systems 116 such as door locks 326 to unlock a vehicle door. In some embodiments, response module 140 may be configured to lower at least one vehicle window using other vehicles systems 116 such as vehicle window controllers 324. In some cases, response module 140 may be configured to lower two vehicle windows to cause a draft in vehicle 310 that may be more successful in alleviating the situation of extreme temperature.

In some embodiments, response module 140 may be configured to take other preventative measures such as opening a vehicle sun roof and/or activating a vehicle interior fan. Activating a vehicle interior fan may be especially beneficial in embodiments where vehicle 310 does not have power windows where response module 140 may be unable to open a vehicle sun roof or lower vehicle windows.

In some embodiments, door sensor 114 may be configured to detect when a vehicle door has been opened after ignition switch 112 has been switched off. Response module 140 may be configured to activate a warning mechanism when door sensor 114 has detected that the vehicle door is opened after ignition switch 112 is switched off.

The warning mechanism can include any sort of mechanism to warn the driver of vehicle 310 to check vehicle 310 to ensure that a child or pet has not been left unattended. The warning mechanism may be an audible alert, such as a vocal reminder message stored in memory 136 to remind the driver to check the front and rear seats of vehicle 310 to ensure that a child or pet has not been left unattended. In some embodiments, response module 140 may be configured to generate the audible alert through an audio system included with vehicle 310 or through an additional audio system installed along with the vehicle safety sensing and alerting system.

Figure 2:
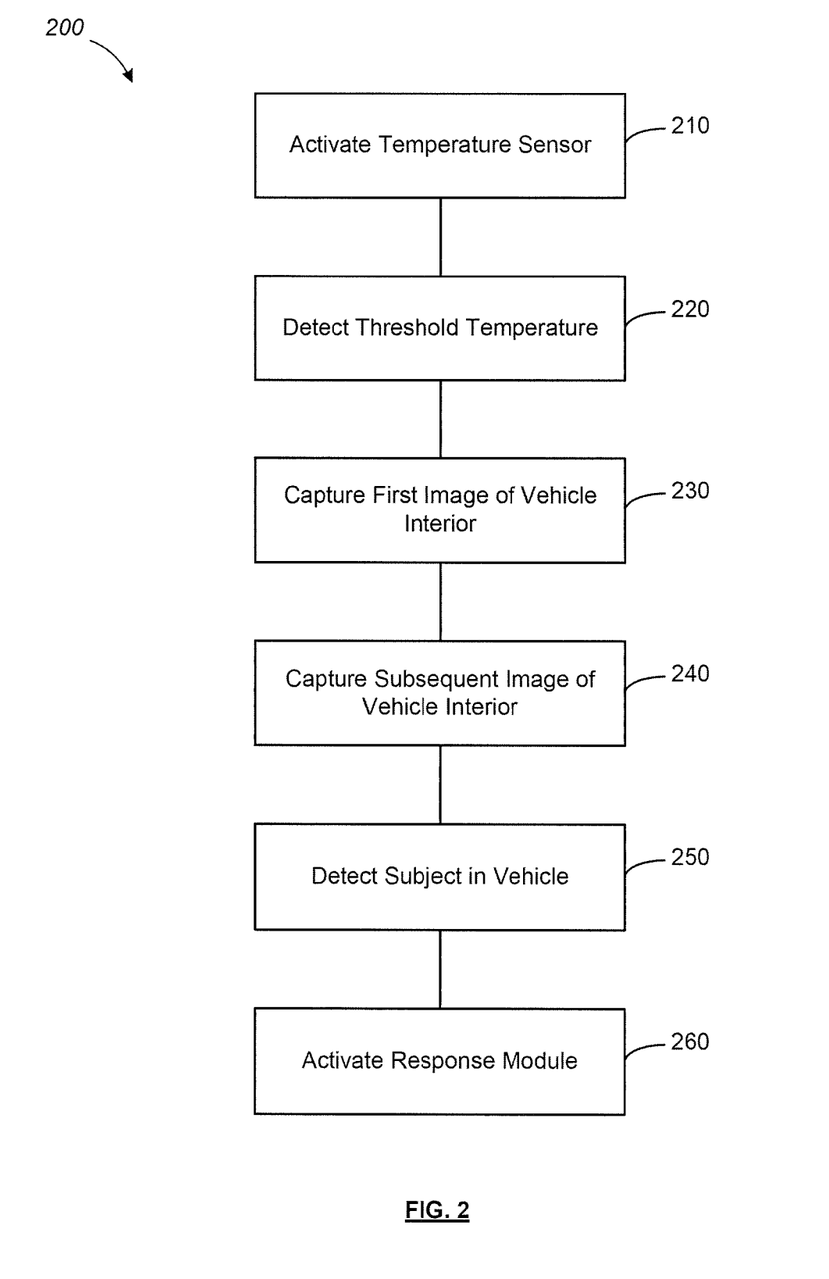
FIG. 2 shows a block diagram of a vehicle safety sensing and alerting method that may be performed by one or more elements of the system of FIG. 1, in accordance with at least one embodiment.

FIG. 2 shows a block diagram which illustrates a method 200 for detecting a subject in a vehicle in accordance with an embodiment. Method 200 is described without limitation. In some embodiments, some acts of method 200 may occur multiple times, and other acts may not occur at all. Method 200 can be performed by a vehicle safety sensing and alerting system such as system 100.

At 210, system 100 activates temperature sensor 120. Temperature sensor 120 may be activated when ignition switch 112 is switched off. In some embodiments, ignition switch 112 may be coupled to a SPST relay that is powered through the vehicle's accessory circuit. When ignition switch 112 is switched off, the SPST relay can activate the temperature sensor 120. Temperature sensor 120 is configured to continually monitor an internal vehicle temperature of vehicle 310.

At 220, temperature sensor 120 detects a threshold temperature. Temperature sensor 120 may include a digital thermostat with a threshold temperature that is indicative of an extreme temperature situation in vehicle 310. When the monitored internal vehicle temperature reaches the threshold temperature a detection module, such as detection module 130, coupled to temperature sensor 120 is automatically activated.

Detection module 130 includes camera 132 installed in vehicle 310. Camera 132 is configured to capture an image of the interior of vehicle 310. Camera 132 is automatically activated when the threshold temperature is detected. In some embodiments, detection module 130 may also include additional detection sensors 134 for detecting a subject in vehicle 310. In those embodiments, additional detection sensors 134 are also automatically activated when the threshold temperature is detected.

At 230, camera 132 captures a first image of the interior of vehicle 310. In some embodiments, camera 132 may include a plurality of cameras configured to capture images of the interior of vehicle 310. In those embodiments, each camera is operable to capture a first image of the interior of vehicle 310.

At 240, camera 132 captures a subsequent image of the interior of vehicle 310. Both the first image and the subsequent image may be stored in memory 136. In some embodiments, camera 132 may be configured to capture the second image a predefined interval after capturing the first image. Capturing the second image within a predefined interval may help prevent false alarms that may result from changes in light levels caused by the setting or rising of the sun and/or movement of clouds. In some embodiments, the predefined interval may be a short time period such as 15 seconds for example.

At 250, detection module 130 detects a subject in vehicle 310. Detection module 130 also includes a monitoring module that is configured to analyze the first image and the second image to detect the subject. In some embodiments, the monitoring module may compare the first image and the second image and detect a change based on the comparison. If the detected change is greater than a predefined threshold, the monitoring module may detect a subject in vehicle 310.

In some embodiments, the monitoring module may also take measures to prevent false alarms when analyzing the first image and the second image. For example, if the monitoring module detects a consistent change across all the pixels between the first image and the second image this may indicate an external change, such as a cloud passing by, that is not indicative of a subject in vehicle 310. In some embodiments, if the monitoring module detects a full pixel blackout when analyzing the first image and the second image, this may indicate the presence of a subject covering the camera with a hand or blanket and response module 140 can be activated. External changes causes by storms or clouds passing by would not be detected as a full pixel blackout.

In some cases, regions of interest in vehicle 310 may be identified. Regions of interest may be those regions in which a subject is more likely to be detected or where external changes are less likely to impact the images captured by camera 132. The predefined threshold for detecting a subject may be adjusted, i.e. lowered, in regions of interest so that the monitoring module is more sensitive to changes in those regions. Regions of interest could be detected, for example, by detecting the presence and location of a child seat in vehicle 310.

In some embodiments, camera 132 may be configured to continually capture a subsequent image at the predefined interval after capturing the immediately preceding image. The monitoring module may be configured to analyze the subsequent image and the immediately preceding image to detect a subject in vehicle 310.

In some embodiments, the monitoring module may be configured to compare the subsequent image to the immediately preceding image and detect a subsequent change based on the comparison of the subsequent image and the immediately preceding image. If the detected subsequent change is greater than the predefined threshold then the monitoring module may detect a subject in vehicle 310.

In some embodiments, once the immediately preceding image and the subsequent image have been analyzed, the subsequent image may replace the immediately preceding image in memory 136. Camera 132 may then proceed to capture another subsequent image at the predefined interval to be analyzed along with the new immediately preceding image. Comparing a subsequent image with an immediately preceding image may also reduce false alarms by ensuring that the detected change is not the result of slow gradual changes in light levels.

Detection module 130 may include at least one additional sensor such as an infrared motion sensor, an RF proximity sensor and an audio sensor. In embodiments where the detection module 130 includes more than one detection sensor, the monitoring module may be configured to detect a subject in the vehicle based on any one of the sensors in detection module 130. Also, as mentioned above, in some embodiments, camera 132 may include a plurality of cameras. In those embodiments, the monitoring module may be configured to detect a subject in vehicle 310 when any one of the cameras has detected a subject in vehicle 310.

At 260, response module 140 is activated. Response module 140 may be automatically activated when a subject has been detected in vehicle 310 by detection module 130. Response module 140 is configured to activate one or more alert mechanisms when the subject is detecting. The alert mechanisms may be any mechanisms that can alert individuals close to, or remote from, vehicle 310 that a subject has been detected in an extreme temperature situation. The one or more alert mechanisms may include a wireless communication module, a vehicle alarm, a vehicle communication system and vehicle hazard lights.

Response module 140 may also be configured to take at least one preventative measure when the subject is detected. The preventative measure is any measure that is intended to mitigate or alleviate the extreme temperature situation. In some embodiments, the preventative measure may be one of lowering at least one vehicle window, opening a vehicle sun roof, activating a vehicle interior fan and unlocking a vehicle door. Other preventative measures that could be taken to mitigate the situation of extreme temperature will be apparent to the skilled reader.

A number of embodiments have been described herein. However, it will be understood by persons skilled in the art that other variants and modifications may be made without departing from the scope of the embodiments as defined in the claims appended hereto.

The invention claimed is:

1. A system for detecting a subject in a vehicle, the vehicle having an ignition switch and at least one seat, the detection system comprising:
    a temperature sensor installed within the vehicle that monitors an internal vehicle temperature of a vehicle passenger area, the temperature sensor coupled to the ignition switch by a relay coupling and being automatically activated by the relay coupling in response to the ignition switch being switched off, wherein the relay coupling is automatically switched by the ignition switch;
    a detection module coupled to the temperature sensor, the detection module comprising at least a processor, a memory and a camera, the camera being activated in response to the monitored internal vehicle temperature having reached or exceeded a threshold temperature;
    the camera configured to capture a first image of an interior of the vehicle and to subsequently capture a second image of the interior of the vehicle;
    the processor being configured to analyze the first image and the second image to detect the subject by at least one of determining that an average change in pixels is above a first predefined threshold and determining that a threshold number of pixels have experienced a change above a second predefined threshold;
    the processor is configured to activate one or more alert mechanisms when the subject is detected; and
    the processor is further configured to lower at least one vehicle window and unlock at least one vehicle door when the subject is detected;
    wherein the threshold temperature cannot be adjusted after the temperature sensor has been installed.

2. The system as defined claim 1, wherein the camera is configured to subsequently capture the second image a predefined interval after capturing the first image.

3. The system as defined in claim 1, wherein the camera is further configured to continually capture a subsequent image at the predefined interval after capturing an immediately preceding image; and
    the processor is further configured to analyze the subsequent image and the immediately preceding image to detect the subject.

4. The system as defined in claim 3, wherein the processor is further configured to compare the subsequent image to the immediately preceding image;

detect a subsequent change based on the comparison of the subsequent image and the immediately preceding image; and detect the subject when the detected subsequent change is greater than the predefined threshold.

5. The system as defined in claim 1 wherein the vehicle has front seats and rear seats and the camera is installed in the vehicle so as to capture an image including the front seats and the rear seats.

6. The system as defined in claim 1, wherein the detection module further comprises at least one additional detection sensor, the at least one additional detection sensor including at least one of an infrared motion sensor, an RF proximity sensor and an audio sensor.

7. The system as defined in claim 1, wherein the one or more alert mechanisms comprise at least one of a wireless communication module, a vehicle alarm, a vehicle communication system, and vehicle hazard lights.

8. The system as defined in claim 1, wherein the one or more alert mechanisms comprise a cellular communication module.

9. The system as defined in claim 1, wherein the processor is further configured to take at least one additional preventative measure when the subject is detected, the at least one additional preventative measure including at least one of opening a vehicle sun roof and activating a vehicle interior fan.

10. The system as defined in claim 1, wherein the temperature sensor is installed in the vehicle headliner.

11. The system as defined in claim 1, further comprising a door sensor installed in the vehicle, the door sensor configured to detect when a particular vehicle door is opened after the ignition switch is switched off; and the processor is further configured to activate a warning mechanism when the particular vehicle door is opened after the ignition switch is switched off.

12. The system as defined in claim 11, wherein the warning mechanism comprises an audible alert.

13. The system as defined in claim 12, wherein the processor is configured to output the audible alert through a vehicle audio system.

14. The system of claim 1, wherein the temperature sensor is located remotely from the ignition switch and the relay coupling comprises a receiver wirelessly coupling the temperature sensor to the ignition switch.

15. A method for detecting a subject in a vehicle, the vehicle having an ignition switch, at least one seat and a temperature sensor installed within the vehicle, the method comprising:

activating the temperature sensor in response to the vehicle ignition switch being switched off using a relay coupling that is automatically switched by the ignition switch;

monitoring an internal vehicle temperature of a vehicle passenger area using the temperature sensor;

activating a camera when the monitored internal vehicle temperature has reached or exceeded a threshold temperature;

capturing a first image of an interior of the vehicle using the camera;

subsequently capturing a second image of the interior of the vehicle using the camera;

analyzing the first image and the second image to detect the subject in the vehicle by at least one of determining that an average change in pixels is above a first predefined threshold and determining that a threshold number of pixels have experienced a change above a second predefined threshold;

activating an alert mechanism when the subject is detected; and lowering at least one vehicle window and unlocking at least one vehicle door when the subject is detected wherein the threshold temperature cannot be adjusted after the temperature sensor has been installed.

16. The method as defined in claim 15, wherein the second image is captured a predefined interval after the first image is captured.

17. The method as defined in claim 15, further comprising continually capturing a subsequent image at the predefined interval after capturing an immediately preceding image; and analyzing the subsequent image and the immediately preceding image to detect the subject in the vehicle.

18. The method as defined in claim 17, further comprising:

comparing the subsequent image to the immediately preceding image;

detecting a subsequent change based on the comparison of the subsequent image and the immediately preceding image; and detecting the subject when the detected subsequent change is greater than the predefined threshold.

* * * * *